(12) United States Patent
Koyanagi

(10) Patent No.: US 8,513,633 B2
(45) Date of Patent: Aug. 20, 2013

(54) ELECTRONIC CASSETTE FOR RADIOGRAPHIC IMAGING

(75) Inventor: Takahiro Koyanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 13/234,282

(22) Filed: Sep. 16, 2011

(65) Prior Publication Data

US 2012/0074331 A1    Mar. 29, 2012

(30) Foreign Application Priority Data

Sep. 29, 2010  (JP) ................. 2010-219767

(51) Int. Cl.
*G01T 1/105*  (2006.01)

(52) U.S. Cl.
USPC ............................................. 250/584

(58) Field of Classification Search
USPC ....... 250/582, 584, 370.01–370.15; 378/98.8
See application file for complete search history.

(56) References Cited

U.S. PATENT DOCUMENTS

| | | | |
|---|---|---|---|
| 6,784,448 B2 * | 8/2004 | Neriishi et al. | 250/584 |
| 6,949,759 B2 * | 9/2005 | Yonekawa | 250/584 |
| 6,969,861 B2 * | 11/2005 | Shoji et al. | 250/484.4 |
| 7,091,510 B2 * | 8/2006 | Misawa et al. | 250/582 |
| 7,235,808 B2 * | 6/2007 | Sawazumi | 250/584 |
| 7,540,660 B2 | 6/2009 | Koyanagi | 378/189 |
| 2007/0272873 A1 | 11/2007 | Jadrich et al. | 250/370.11 |

FOREIGN PATENT DOCUMENTS

| | | |
|---|---|---|
| EP | 0933650 | 8/1999 |
| EP | 1162479 | 12/2001 |
| EP | 1471384 | 10/2004 |
| JP | 07-140255 | 6/1995 |
| JP | 2003-248060 | 9/2003 |
| JP | 2005-195643 | 7/2005 |

OTHER PUBLICATIONS

Extended European Search Report dated Jan. 2012, issued in counterpart application EPA 11182746.5.

* cited by examiner

*Primary Examiner* — Kiho Kim
(74) *Attorney, Agent, or Firm* — Fitzpatrick, Cella, Harper & Scinto

(57) ABSTRACT

An electronic cassette for radiographic imaging has an enclosure, an imaging detection panel disposed in the enclosure and configured to convert an amount of radiation into an electric signal, a circuit unit disposed in the enclosure and configured to read an electric signal from the imaging detection panel by supplying a driving signal to the imaging detection panel, and a holding base disposed in the enclosure and configured to support the imaging detection panel. The holding base supports the imaging detection panel on a first surface as a radiation incident side and supports the circuit unit on a second surface on an opposite side to the first surface. The holding base includes a carbon fiber laminated plate having a metal layer inserted in lamination layer, and the metal layer is electrically connected to ground of the circuit unit.

9 Claims, 2 Drawing Sheets

ELECTRONIC CASSETTE FOR RADIOGRAPHIC IMAGING

BACKGROUND OF THE INVENTION

1. Field of the Invention

The present invention relates to an electronic cassette for radiographic imaging.

2. Description of the Related Art

Radiographic imaging apparatuses, which capture radiographic images of objects by irradiating the objects with radiation (for example, X-rays) and detecting the intensity distributions of X-rays transmitted through the objects, are known and widely used in the medical and industrial fields. Two methods of radiographic imaging are available, namely, a film/screen method and a CR method. These methods use photosensitive films or phosphor plates which retain images as latent images, such films or plates being stored in storage cases called film cassettes, which are standardized under JIS Z 4905 (referred to herein as "document 1"). In some cases, a radiographic imaging apparatus is used, which uses a DR (Digital Radiography) method using a flat panel detector (referred to herein as an "FPD") formed from a thin-film semiconductor material on an insulating substrate. A cassette used for radiographic imaging based on such DR method is referred to herein as an "electronic cassette".

In general, radiographic imaging apparatuses are installed and used in a so-called radiation room. With recent advances in packaging techniques, a low-profile, light-weight portable electronic cassette has been commercialized to allow quicker imaging of wider regions of an object, and an electronic cassette which achieves a reduction in thickness and weight while withstanding specified loads has been proposed (see Japanese Patent Laid-Open No. 2005-195643 (referred to herein as "document 2")).

There are various kinds of bases such as stands for standing positions and tables for lying positions, which are used to position cassettes relative to objects (such as a human body or part thereof) in accordance with desired imaging forms. Many of these bases are designed in conformity with the outer shapes of film cassettes having the standard sizes defined in document 1. If an electronic cassette for radiographic imaging based on the DR method does not conform to a standard size, it is necessary to introduce a new base when introducing a radiographic imaging apparatus based on the DR method. This extra equipment increases the investment cost. It is therefore required to provide a radiographic imaging apparatus (electronic cassette), based on the DR method, which has almost the same outer shape as that of the film cassette standardized in document 1. For this purpose, with advances in high-density packing techniques and wireless techniques, an electronic cassette having an outer size compatible with the standard size of a film cassette has been proposed (Japanese Patent Laid-Open No. 07-140255 (referred to herein as "document 3")). An electronic cassette having the same size as that of a standardized film cassette can be held in various kinds of existing bases formed in conformity to a film cassette size. Therefore, it is possible to introduce an imaging apparatus based on the DR method while minimizing the necessary investment in new equipment.

When making an electronic cassette with almost the same dimensions as those of a film cassette whose outer dimensions are standardized according to document 1, since the outer size includes a margin of about 15 mm around an imaging region, electric components are disposed on the rear surface side of the FPD. It is therefore necessary to dispose the FPD and electric components in the thickness direction within the thickness of the cassette, that is, 15 mm. This makes it necessary to design an electronic cassette in consideration of the influence of electrical noise on images due to low-profile high-density packaging.

Imaging techniques using an electronic cassette include imaging performed while the electronic cassette is placed on a soft surface, such as a bed in a hospital ward. The object to be imaged is then placed on the cassette and imaging is performed while the local load, such as that from the head or extremities of a person that are the object being imaged is imposed on the electronic cassette. In such an imaging technique, since the body weight of the patient directly acts on the electronic cassette, the cassette is required to have high rigidity. In addition, since a technician carries the electronic cassette to an imaging position, the electronic cassette itself is required to be light weight. Therefore, the electronic cassette is required to have almost the same outer shape as that of a film cassette with a standard size while being both robust and light weight, whilst being designed internally so as to address the issue of deterioration in image quality due to noise or the like described above. Documents 2 and 3, however, give no consideration to challenges associated with these requirements.

SUMMARY OF THE INVENTION

The present invention provides an electronic cassette for radiographic imaging which achieves reductions in weight, size, and thickness and provides excellent operability while maintaining high robustness and noise resistance.

According to one aspect of the present invention, there is provided an electronic cassette for radiographic imaging comprising: a housing; an imaging detection panel which is disposed in the housing and configured to convert incident radiation into an electric signal; a circuit which is disposed in the housing and configured to drive the imaging detection panel by supplying a driving signal to the imaging detection panel and detecting an electrical signal from the imaging detection panel; and a holding base which is disposed in the housing and configured to support the imaging detection panel, wherein the holding base has a first surface configured to support the imaging detection panel and a second surface on an opposite side to the first surface, the second surface being configured to support the circuit; and wherein the holding base includes a carbon fiber laminated plate including a metal layer inserted in the carbon fiber lamination layer, the metal layer being electrically connected to ground of the circuit.

Further features of the present invention will become apparent from the following description of embodiments with reference to the attached drawings.

DESCRIPTION OF THE EMBODIMENTS

Embodiments of the present invention will be described in detail below with reference to the accompanying drawings.

First Embodiment

Figure 1:
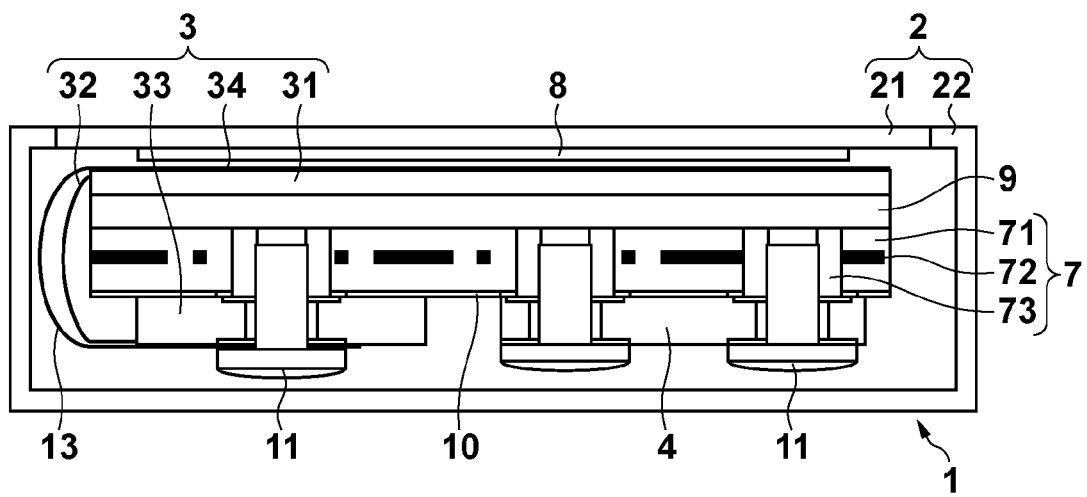
FIG. 1 is a side sectional view of an electronic cassette according to the first embodiment.
Figure 2:
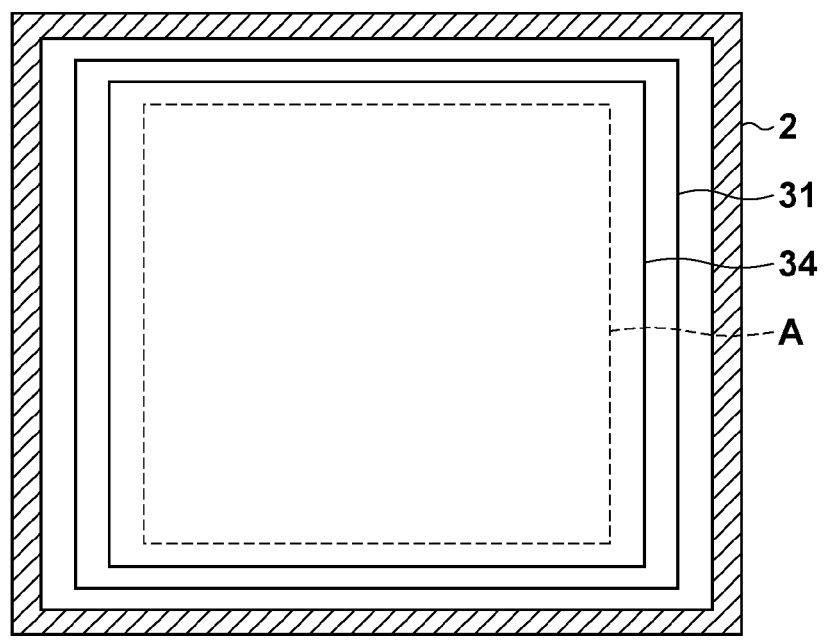
FIG. 2 is a plan sectional view of the electronic cassette according to the first embodiment.

FIGS. 1 and 2 are views showing an example of the arrangement of an electronic cassette for radiographic imaging (referred to herein as an electronic cassette) in accordance with a first embodiment of the present invention. FIG. 1 is a side sectional view of the electronic cassette according to this embodiment. FIG. 2 is a plan sectional view of the electronic cassette of FIG. 1.

A main body enclosure or housing 2 of an electronic cassette 1 includes a front plate 21 placed on the radiation incident side and an enclosure 22 forming the remaining surfaces. The front plate 21 is made of a material with a high radiation transmissivity to permit incident radiation to be transmitted through it onto an imaging detection panel 31 of a radiation image sensor 3. The enclosure 22 is made of a metal with high electromagnetic noise shielding performance and rigidity, such as a magnesium alloy or an aluminum alloy. The radiation image sensor 3 is disposed in the main body enclosure 2. In addition, a buffer material 8 is disposed between the front plate 21 and the radiation image sensor 3 to protect the surface of the radiation image sensor 3.

The radiation image sensor 3 includes the imaging detection panel 31 having a plurality of pixel devices two-dimensionally arrayed on an insulating substrate (for example, a glass substrate). In this case, each pixel device includes a conversion element for converting incident radiation into a corresponding electrical charge and a switch element for producing an electrical signal based on the electrical charge. This embodiment uses, as an arrangement for converting incident radiation into an electrical charge, an arrangement having a scintillator (not shown) provided on the radiation incident surface side of the imaging detection panel 31 to convert incident radiation into a corresponding amount of light and to convert the light into an electrical charge. Obviously, it is possible to use an arrangement which directly converts incident radiation into an electrical charge. The imaging detection panel 31 is connected to a driving/reading circuit 33 via a flexible circuit board 32. The driving/reading circuit 33 includes a reading circuit unit for reading an electric signal from each pixel device of the imaging detection panel 31 and a driving circuit unit for supplying, to the switch element of each pixel device, a driving signal having a voltage for turning on the switch element. As shown in FIG. 2, an imaging pixel region A of the imaging detection panel 31 is covered by a noise shield sheet 34 having an area equal to or more than that of the imaging pixel region. Note that the noise shield sheet 34 serves to suppress the influence of electromagnetic radiation from external devices, that is, to prevent the electromagnetic radiation from the external devices from reaching the panel 31.

The imaging detection panel 31 is supported by a first surface of a holding base 7, on the radiation incident side of the holding base 7. Note that in this embodiment, the imaging detection panel 31 is joined to the first surface of the holding base 7 through an insulator 9 having antireflection and impact absorption effects. The antireflection effect of the insulator 9 serves to prevent light converted by the scintillator (phosphor) which wavelength-converts radiation into visible light from being reflected by the rear surface (the surface on the opposite side to the radiation incident surface) and striking the panel again. In addition, a second surface on the opposite side to the first surface of the holding base 7 holds various kinds of circuit units (various kinds of electric circuit boards) such as the driving/reading circuit 33 (the reading circuit unit and driving circuit unit) and a control circuit unit 4 which controls electric signals. Note that in this embodiment, these circuit units 33 are mounted on the second surface of the holding base 7, opposite the radiation incident surface of the holding base 7 through an insulating sheet 10 with fixing members 11. The fixing members 11 are fixed to fixing portions 73 by fitting, screwing, or the like.

Depending on the imaging method to be used, the body weight of a patient directly acts on the front plate 21 serving as the radiation incident surface of the main body enclosure 2, and hence stress may be generated in the radiation image sensor 3 and the mounted electric components arranged inside the main body enclosure 2. For this reason, in order to prevent the internal components from being damaged, the main body enclosure 2 and the holding base 7 preferably form a structure which ensures rigidity and suppresses the overall deformation and local deflection and deformation of the electronic cassette 1.

When the electronic cassette 1 is made to have almost the same outer dimensions as those of a film cassette standardized according to non-patent document 1, the thickness of the electronic cassette 1 is 15 mm. Therefore, the thickness of the holding base 7 is preferably restricted to 3 mm or less in consideration of the thicknesses of the respective components (for example, the enclosure, FPD, circuit/control boards, wireless antenna, and battery). In this embodiment, in consideration of a reduction in weight in addition to ensuring rigidity described above, the holding base 7 is formed from a laminated plate (carbon fiber laminated plate) made of a carbon fiber composite with a bending elasticity of 140 Gpa or more. As compared with the holding base 7 made of a uniform metal (for example, an aluminum alloy or magnesium alloy), this arrangement can obtain a mass about ⅔ that of the holding base 7 made of the aluminum alloy, a maximum deflection amount about twice that of the holding base 7 made of the aluminum alloy, and a rigidity about three times that of the holding base 7 made of the magnesium alloy. Note that the above value of bending elasticity is a preferred example and does not limit the present invention. However, since an increase in bending elasticity increases the cost, a proper bending elasticity is set in consideration of the tradeoff between them.

In addition, in consideration of the influence of electric noise from the viewpoint of image quality, the potential of the holding base 7 is set to ground (electric ground) as a reference potential for electric circuits. Therefore, the holding base 7 is preferably made of a material with a low electric resistivity. However, the electric resistivity of a carbon fiber laminated plate is higher than that of a metal (for example, an aluminum alloy or magnesium alloy). In order to solve this problem, the holding base 7 in this embodiment is formed from a composite plate obtained by stacking a metal layer 72 between carbon fiber layers 71. In addition, a plurality of fixing portions 73 made of a metal (for example, an aluminum alloy) which serve to fix various kinds of electric circuit boards are pressed into the holding base 7 so as to penetrate it in the stacking direction. Each of the fixing portions 73 is connected to the metal layer 72 at a constant potential (at the same potential). The ground terminals of the driving/reading circuit 33 and control circuit unit 4 are connected to the metal layer 72 via the fixing portions 73.

In this embodiment, the metal layer 72 has a mesh structure which forms a plane perpendicular to the incident direction of radiation and has an area equal to or more than that of the imaging pixel region A, a lower electric resistivity, and an opening size suited to suppress noise. Assume that the metal layer 72 in this embodiment has a mesh structure made of aluminum or copper which has an opening (mesh size) of about 0.5 mm and a wire diameter of 0.15 mm. The metal layer 72 can be made of a metal other than aluminum or copper, for example, magnesium, molybdenum, or stainless steel. Using a mesh structure can obtain the effect of suppressing deformation due to thermal expansion, an anchor effect with the resin adhesive layer of the carbon fiber laminated layer, and the effect of easily ensuring the rigidity of the holding base 7 while maintaining high joint strength. Note that the metal layer 72 and the fixing portions 73 may be made of materials other than those described above as long as a combination of materials to be used have a potential difference that suppresses corrosion due to electrochemical reactions. In addition, the metal layer 72 may be formed from a metal film sheet also having a radiation shielding function instead of a mesh structure.

With the above structure of the electronic cassette 1, the potential of the holding base 7 is set at ground for grounding of the electric circuits to a reference potential. The following are the electrical paths in this embodiment. The imaging detection panel 31 is electrically connected to the fixing portions 73 provided on the holding base 7 via the flexible circuit board 32 and the driving/reading circuit 33. A connecting portion 13 extends from the noise shield sheet 34 on the surface of the radiation image sensor 3. The noise shield sheet 34 is electrically connected to the fixing portions 73 of the holding base 7 via the connecting portion 13, the driving/reading circuit 33, and the fixing members 11. The control circuit unit 4 is electrically connected to the fixing portions 73 of the holding base 7 directly or via the fixing members 11.

With the above arrangement, the imaging detection panel 31 is covered by the noise shield sheet 34, the metal layer 72 of the holding base 7, the connecting portion 13 connected to them, and the shield (shield at ground potential) set at a constant potential by the driving/reading circuit 33. This makes it possible to block external noise and obtain stable images. In addition, the above arrangement implements a compact, low-profile electronic cassette while maintaining high robustness and noise resistance.

Second Embodiment

Figure 3:
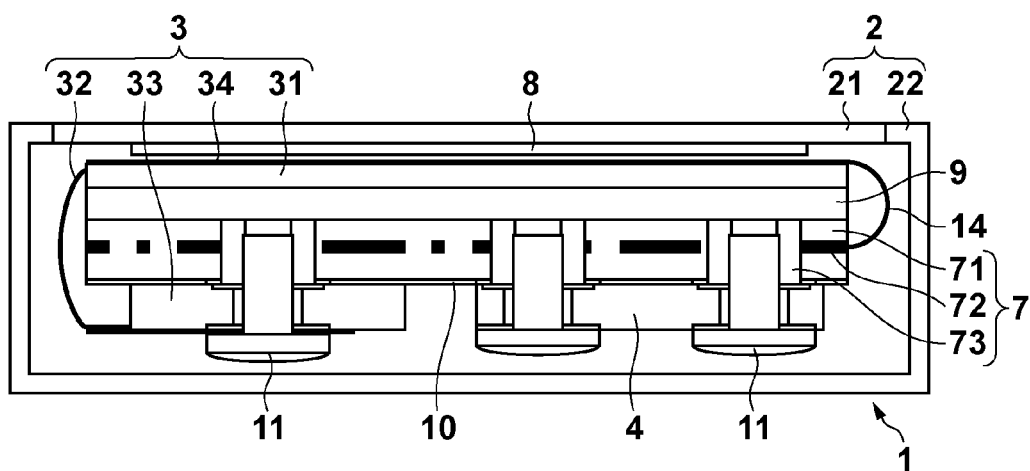
FIG. 3 is a side sectional view of an electronic cassette according to the second embodiment.

In the first embodiment, the noise shield sheet 34 is connected to the metal layer 72 via the fixing portions 73. The second embodiment will exemplify an arrangement (FIG. 3) in which a noise shield sheet 34 is directly connected to a metal layer 72 by using a connecting portion 14. FIG. 3 is a side sectional view of an electronic cassette according to the second embodiment. The noise shield sheet 34 on the surface of a radiation image sensor 3 is connected to the metal layer 72 of a holding base 7 via the connecting portion 14 made of a material with a low electric resistivity. The metal layer 72 of the holding base 7 is electrically connected to the fixing portions 73. Note that the metal layer 72 may be a metal film sheet also having a radiation shielding function instead of a mesh structure, as described in the first embodiment.

The following are the electrical paths in the second embodiment. The imaging detection panel 31 is electrically connected to the fixing portions 73 of the holding base 7 via a flexible circuit board 32 and a driving/reading circuit 33. The connecting portion 14 extends from the noise shield sheet 34 on the surface of the radiation image sensor 3. The connecting portion 14 is directly and electrically connected to the metal layer 72 of the holding base 7 and is electrically connected to the fixing portions 73. The control circuit unit 4 is electrically connected to the fixing portions 73 of the holding base 7 directly or via fixing members 11.

Directly connecting the noise shield sheet (connecting portion 14) to the metal layer 72 of the holding base in this manner forms an arrangement which can implement more stable electric grounding of the noise shield sheet 34.

Third Embodiment

Figure 4:
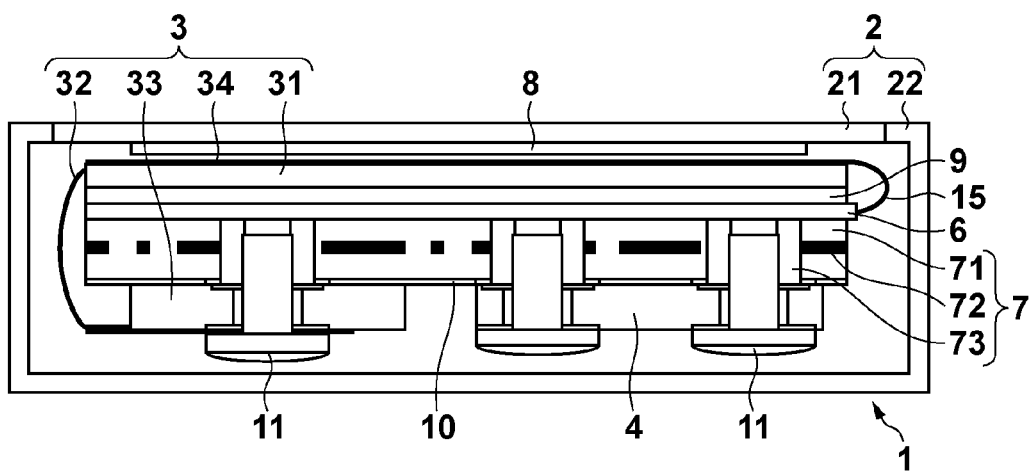
FIG. 4 is a side sectional view of an electronic cassette according to the third embodiment.

The third embodiment will exemplify an arrangement (FIG. 4) in which a shield plate 6 is inserted between an imaging detection panel 31 and a holding base 7 and which can acquire more stable images from an electronic cassette 1. FIG. 4 is a side sectional view of the electronic cassette according to the third embodiment. In the electronic cassette 1 of the third embodiment, the imaging detection panel 31 is joined to the shield plate 6 made of a material having radiation shielding and noise shielding effects through an insulator 9 having antireflection and impact absorption effects.

According to the above arrangement, the holding base 7 serves as circuit ground for connecting a driving/reading circuit 33 and a control circuit unit 4 at a constant potential and grounding them to a reference potential. In addition, a noise shield sheet 34 provided on the surface of the radiation image sensor 3 is connected to the shield plate 6 at a constant potential via a connecting portion 15 made of a material with a low electric resistivity.

The following are the electrical paths in the third embodiment. The imaging detection panel 31 is electrically connected to the driving/reading circuit 33 via a flexible circuit board 32. The driving/reading circuit 33 is electrically connected to fastening portions 73 of a holding base 7. The connecting portion 15 extends from the noise shield sheet 34 on the surface of the radiation image sensor 3, and is electrically connected to the shield plate 6. The shield plate 6 is electrically connected to the fastening portions 73 of the holding base 7. The control circuit unit 4 is electrically connected to the fastening portions 73 directly or via fastening members 11.

As described above, in the electronic cassette 1 according to the third embodiment, since the imaging detection panel 31 is shielded by the shield plate 6, the imaging detection panel 31 can be shielded by a space in which neighboring members are in tighter contact with it than in the first and second embodiments. Separating the imaging detection panel 31 from the holding base 7 as electric circuit ground in this manner makes it possible to obtain more stable images by reducing the influence of the circuit ground portion.

The present invention can provide an electronic cassette for radiographic imaging which achieves reductions in weight, size, and thickness while maintaining high robustness and noise resistance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2010-219767, filed Sep. 29, 2010, which is hereby incorporated by reference herein in its entirety.

What is claimed is:
1. An electronic cassette for radiographic imaging comprising:
   an imaging detection panel configured to convert incident radiation into an electric signal;
   a holding base configured to support said imaging detection panel,
   wherein said holding base includes a carbon fiber laminated plate including a metal layer inserted in a carbon fiber lamination layer, said metal layer being electrically maintained at a prescribed voltage.

2. The cassette according to claim 1, wherein said metal layer of said holding base forms a plane perpendicular to an incident direction of radiation incident on said imaging detection panel, and has an area not less than an area of an imaging pixel region of said imaging detection panel.

3. The cassette according to claim 1, further comprising:
 a fixing portion electrically connected to said metal layer; and
 a circuit configured to drive said imaging detection panel by supplying a driving signal to said imaging detection panel and detecting an electrical signal from said imaging detection panel,
 wherein said circuit is fixed to said holding base by said fixing portion, and ground of said circuit is connected to said metal layer via said fixing portion.

4. The cassette according to claim 3, wherein said holding base has a first surface configured to support said imaging detection panel and a second surface on an opposite side to said first surface, said second surface being configured to support said circuit, and
 wherein said fixing portion penetrates through said first surface and said second surface of said holding base.

5. The cassette according to claim 1, further comprising a noise shield sheet which covers at least an imaging pixel region of said imaging detection panel and is electrically connected to said metal layer of said holding base.

6. The cassette according to claim 5, further comprising a connecting portion configured to directly connect said noise shield sheet to said metal layer.

7. The cassette according to claim 1, further comprising a shield plate which is provided between said imaging detection panel and said holding base and is electrically connected to said metal layer.

8. The cassette according to claim 1, wherein said metal layer of said holding base comprises a mesh structure.

9. An electronic cassette for radiographic imaging comprising:
 a housing;
 an imaging detection panel which is disposed in said housing and configured to convert incident radiation into an electric signal;
 a circuit which is disposed in said housing and configured to drive said imaging detection panel by supplying a driving signal to said imaging detection panel and detecting an electrical signal from said imaging detection panel; and
 a holding base which is disposed in said housing and configured to support said imaging detection panel,
 wherein said holding base has a first surface configured to support said imaging detection panel and a second surface on an opposite side to said first surface, said second surface being configured to support said circuit, and
 wherein said holding base includes a carbon fiber laminated plate including a metal layer inserted in a carbon fiber lamination layer, said metal layer being electrically connected to ground of said circuit.

\* \* \* \* \*